United States Patent
Fu et al.

(10) Patent No.: US 10,520,064 B2
(45) Date of Patent: Dec. 31, 2019

(54) DUAL-CLUTCH AUTOMATIC TRANSMISSION

(71) Applicants: ZHEJIANG GEELY HOLDING GROUP CO., LTD, Hangzhou (CN); NINGBO UMD AUTOMATIC TRANSMISSION CO., LTD, Ningbo (CN)

(72) Inventors: Lingling Fu, Hangzhou (CN); Bo Huang, Hangzhou (CN); Dawei Luo, Hangzhou (CN); Jianghai Liu, Hangzhou (CN); Daguo Luo, Hangzhou (CN)

(73) Assignees: ZHEJIANG GEELY HOLDING GROUP CO., LTD, Zhejiang (CN); NINGBO UMD AUTOMATIC TRANSMISSION CO., LTD, Zhejiang (CN)

( * ) Notice: Subject to any disclaimer, the term of this patent is extended or adjusted under 35 U.S.C. 154(b) by 798 days.

(21) Appl. No.: 15/029,840

(22) PCT Filed: Sep. 29, 2014

(86) PCT No.: PCT/CN2014/087813
§ 371 (c)(1),
(2) Date: Apr. 15, 2016

(87) PCT Pub. No.: WO2015/055086
PCT Pub. Date: Apr. 23, 2015

(65) Prior Publication Data
US 2016/0252161 A1  Sep. 1, 2016

(30) Foreign Application Priority Data

Oct. 16, 2013  (CN) .......................... 2013 1 0486439

(51) Int. Cl.
F16H 3/085 (2006.01)
F16H 57/037 (2012.01)
(Continued)

(52) U.S. Cl.
CPC ............. F16H 3/085 (2013.01); F16H 3/006 (2013.01); F16H 57/037 (2013.01);
(Continued)

(58) Field of Classification Search
CPC ........ F16H 3/006; F16H 3/085; F16H 57/037; F16H 63/3425; F16H 2003/0931; F16H 2200/0056
(Continued)

(56) References Cited

U.S. PATENT DOCUMENTS 4,369,867 A * 1/1983 Lemieux ................. B60T 1/005
              188/31
7,383,749 B2 * 6/2008 Schafer ................... F16H 3/006
              74/330

(Continued)

FOREIGN PATENT DOCUMENTS

CN    101691886 A    4/2010
CN    101713459 A    5/2010
(Continued)

OTHER PUBLICATIONS

International Search Report from International Patent Application No. PCT/CN2014/087813 dated Jan. 4, 2015.

Primary Examiner — William C Joyce
(74) Attorney, Agent, or Firm — Alston & Bird

(57) ABSTRACT

A dual-clutch automatic transmission having seven forward gears and one reverse gear, wherein a seventh-gear driving gearwheel, a first-gear driving gearwheel, a fifth-gear driving gearwheel and a third-gear driving gearwheel are individually and fixedly arranged on a first input shaft, a (Continued)

fourth-gear driving gearwheel and a second-gear driving gearwheel are individually and fixedly arranged on a second input shaft, driven gearwheels respectively and correspondingly engaged with the driving gearwheels are rotatably supported on the first output shaft and the second output shaft. The fourth-gear driving gearwheel is also used as a sixth-gear driving gearwheel, and the gear sets of other gears are not shared, which is conducive to decrease the overall axial length of the transmission, facilitates full vehicle arrangement, and prevents the speed ratio ranges of other gears from being influenced by sharing of these gear sets to adapt to more vehicle models. In addition, the arrangement of a parking ratchet wheel is optimized in the present invention, the stress distribution on the output shafts can be more even, and thus the stability is improved and the service life is prolonged.

9 Claims, 2 Drawing Sheets

(51) Int. Cl.
*F16H 63/34* (2006.01)
*F16H 3/00* (2006.01)
*F16H 3/093* (2006.01)

(52) U.S. Cl.
CPC . *F16H 63/3425* (2013.01); *F16H 2003/0931* (2013.01); *F16H 2200/0056* (2013.01)

(58) Field of Classification Search
USPC .......................................................... 74/330
See application file for complete search history.

(56) References Cited

U.S. PATENT DOCUMENTS 9,222,565 B2 * 12/2015 Pichler ................... F16H 48/22
2010/0255950 A1 10/2010 Mellet et al.

FOREIGN PATENT DOCUMENTS

| CN | 101907150 A | 12/2010 |
| CN | 101975251 A | 2/2011 |
| CN | 101975252 A | 2/2011 |
| CN | 201827306 A | 5/2011 |
| CN | 102483134 A | 5/2012 |
| CN | 202484236 A | 10/2012 |
| CN | 103148175 A | 6/2013 |
| KR | 10-1063506 | * 9/2011 |

* cited by examiner

DUAL-CLUTCH AUTOMATIC TRANSMISSION

FIELD OF THE INVENTION

The present invention relates to the field of automobile transmissions, and in particular, to a dual-clutch automatic transmission.

BACKGROUND OF THE INVENTION

Energy conservation and emission reduction have become a main design direction in the development of the automotive industry nowadays, and design requirements of full vehicles on transmissions are increasingly strict. Therefore, dual-clutch automatic transmissions having high efficiency, high comfort and high speed ratio ranges gradually become a development trend. The structure of power train and the arrangement of parking ratchet wheels in the dual-clutch automatic transmissions are important parts of the entire transmissions, and are also primary conditions in subsequent mechanical hardware design and software design. As such, the requirements of the dual-clutch automatic transmissions on power train and the arrangement of the parking ratchet wheels are higher and higher.

With regard to the power train, in order to obtain better dynamic performance and economical efficiency, a wider speed ratio range and a more reasonable speed ratio distribution have become an important development direction of the transmissions. Although great progress has been made in the shafting design of a lot of dual-clutch automatic transmissions, some defects caused by non-overall consideration still exist, resulting in shortcomings on the aspects of structure compactness, transmission performance and working stability.

SUMMARY OF THE INVENTION

An object of the present invention is to provide a dual-clutch automatic transmission with a compact structure and a wider application range.

Another object of the present invention is to decrease the radial length and the number of internal parts of the transmission and optimize an assembly process.

A further object of the present invention is to ensure a safer and more stable operation of the above transmission.

In particular, the present invention provides a dual-clutch automatic transmission, including:
a first input shaft having a first end and a second end opposite to the first end of the first input shaft;
a first clutch connected to the first input shaft at the first end of the first input shaft;
a second input shaft having a first end and a second end opposite to the first end of the second input shaft; wherein the second input shaft is a hollow shaft and is sleeved on the first input shaft;
a second clutch connected to the second input shaft at the first end of the second input shaft;
a seventh-gear driving gearwheel, a first-gear driving gearwheel, a fifth-gear driving gearwheel and a third-gear driving gearwheel, which are individually arranged and are fixedly connected to the first input shaft;
a fourth-gear driving gearwheel and a second-gear driving gearwheel, which are individually arranged and are fixedly connected to the second input shaft; wherein,
the fourth-gear driving gearwheel is also used as a sixth-gear driving gearwheel, and the second-gear driving gearwheel is also used as a reverse-gear driving gearwheel in order to omit a reverse-gear shaft;
a first output shaft and a second output shaft on which driven gearwheels respectively engaged with the corresponding driving gearwheels are rotatably supported; and
a parking ratchet wheel.

Further, the seventh-gear driving gearwheel, the first-gear driving gearwheel, the fifth-gear driving gearwheel and the third-gear driving gearwheel are sequentially arranged on the first input shaft along a direction from the second end of the first input shaft to the first end of the first input shaft.

Further, the fourth-gear driving gearwheel and the second-gear driving gearwheel are sequentially arranged on the second input shaft along a direction from the second end of the second input shaft to the first end of the second input shaft.

Further, a seventh-gear driven gearwheel, a fifth-gear driven gearwheel, a sixth-gear driven gearwheel and a second-gear driven gearwheel respectively and correspondingly engaged with the seventh-gear driving gearwheel, the fifth-gear driving gearwheel, the fourth-gear driving gearwheel and the second-gear driving gearwheel are rotatably supported on the second output shaft.

Further, a first-gear driven gearwheel, a third-gear driven gearwheel and a fourth-gear driven gearwheel respectively and correspondingly engaged with the first-gear driving gearwheel, the third-gear driving gearwheel and the fourth-gear driving gearwheel, and a reverse-gear driven gearwheel are rotatably supported on the first output shaft.

Further, the parking ratchet wheel is fixedly connected to the second output shaft between the fifth-gear driven gearwheel and the sixth-gear driven gearwheel.

Further, the dual-clutch automatic transmission further includes a differential with a differential case; wherein, the parking ratchet wheel is fixedly arranged on the differential case.

Further, the second-gear driven gearwheel is also used as a reverse-gear idle gearwheel to be engaged with the reverse-gear driven gearwheel.

Further, the dual-clutch automatic transmission further includes a reverse-gear idle gearwheel rotatably supported on the second output shaft, and the reverse-gear idle gearwheel is engaged with the reverse-gear driven gearwheel; wherein, the reverse-gear idle gearwheel is located at a side of the second-gear driven gearwheel away from the sixth-gear driven gearwheel, and constitutes a form of a duplex gear with the second-gear driven gearwheel.

Further, the dual-clutch automatic transmission further includes a reverse-gear idle gearwheel rotatably supported on the second output shaft, and the reverse-gear idle gearwheel is engaged with the reverse-gear driven gearwheel; wherein, the reverse-gear idle gearwheel is located at a side of the second-gear driven gearwheel facing the sixth-gear driven gearwheel, and constitutes a form of a duplex gear with the second-gear driven gearwheel.

Further, a first-third-gear synchronizer is fixedly arranged on the first output shaft between the first-gear driven gearwheel and the third-gear driven gearwheel; and a fourth-reverse-gear synchronizer is fixedly arranged on the first output shaft between the fourth-gear driven gearwheel and the reverse-gear driven gearwheel; and
a second-sixth-gear synchronizer is fixedly arranged on the second output shaft between the sixth-gear driven gearwheel and the second-gear driven gearwheel; and a fifth-seventhgear synchronizer is fixedly arranged on the second output shaft between the seventh-gear driven gearwheel and the fifth-gear driven gearwheel.

According to the dual-clutch automatic transmission of the present invention, among the forward gears, only the fourth gear and the sixth gear share a driving gearwheel, the driving gearwheels of other forward gears are not shared, and the speed ratio ranges of these other gears are not influenced due to no sharing of gear sets, so that it is easier for the transmission to adjust the speed ratio according to the demands of matched vehicle models in order to adapt to more vehicle models. In addition, the reverse-gear shaft is omitted according to the present invention, which effectively decreases the radial size of the transmission, ensures simpler assembly and benefits the achievement of light weights of automobiles. In the meanwhile, a duplex gear is used for the reverse gear, which is more conducive to the distribution and adjustment of speed ratios of the second gear and the reverse gear, and reduces the requirements on the starting thermal capacity of clutches at the reverse gear.

Further, in the dual-clutch automatic transmission of the present invention, the first gear and the reverse gear are controlled by different clutches, which is more conducive to the distribution and adjustment of speed ratios of the first gear and the reverse gear, and lowers the requirements on the starting thermal capacity of the clutches particularly at the first gear.

Further, in the dual-clutch automatic transmission of the present invention, the seventh-gear gearwheel set as a high-speed gear is arranged at the outermost end of the first input shaft, so that the influence on the first input shaft resulting from a centrifugal force generated by high speed rotation can be relieved, the service life is prolonged, and further, the operation of the transmission is safer and more stable.

Further, in the dual-clutch automatic transmission of the present invention, a part of low-speed gears are arranged in the middle of a part of the high-speed gears, that is, there are two high speed gears are respectively arranged at both sides of a low gear, for example, the first-gear with low speed is arranged between the fifth-gear and the seventh-gear with high speeds, as another example, the third-gear with low speed is arranged between the fifth-gear and the sixth-gear with high speeds, and the like. In this way, the stress to the output shafts and the input shafts for supporting the gearwheels is more balanced, and the stability of the entire structure is improved. Because of the even distribution of gearwheels of the high-speed gears, the influence on the above stability caused by the change of a total axial length of the dual-clutch automatic transmission is relatively small, and thus the dual-clutch automatic transmission can be applied to more vehicle models.

Further, in the dual-clutch automatic transmission of the present invention, the parking ratchet wheel is arranged on the differential case, so that the axial length of the transmission can be saved, and the full vehicle carrying and the arrangement of a parking pull rod mechanism of the transmission are facilitated. Compared to the manner that the parking ratchet wheel is arranged near the differential gear ring, the present invention can further save the axial length of the differential and is convenient for full vehicle carrying and the arrangement of the parking pull rod mechanism of the transmission as well.

Further, in the dual-clutch automatic transmission of the present invention, the parking ratchet wheel is fixedly arranged on the second output shaft between the fifth-gear driven gearwheel and the sixth-gear driven gearwheel, namely, is located at an intermediate position of the second output shaft, so that the stress distribution of the output shaft is more uniform, the stability is improved, and the service life is prolonged.

In accordance with the following detailed descriptions of the embodiments of the present invention in combination with accompany drawings, those skilled in the art will better understand the above and other objects, advantages and features of the present invention.

BRIEF DESCRIPTION OF THE DRAWINGS

Hereinafter, some specific embodiments of the present invention will be described below in detail in an illustrative rather than a restrictive manner with reference to the accompanying drawings. The same reference signs in the drawings designate identical or similar components or parts. Those skilled in the art should appreciate that these drawings are not necessarily drawn to scale. In the drawings.

DETAILED DESCRIPTION OF THE EMBODIMENTS

The inventor of the present application finds that, in the structures of existing dual-clutch automatic transmissions, due to some factors, sharing a driving gearwheel by two gears may be adopted, but this structure will lead to a limited gear speed ratio range, and will eventually limit the application of the transmission in more vehicle models. In addition, in the structures of existing dual-clutch automatic transmissions, the arrangement of high-speed and low-speed gears is inappropriate, thereby resulting in poor stability of a dual-clutch automatic transmissions, and the stability will decrease with the increasing of the total axial length of the dual-clutch automatic transmission, thereby indirectly limiting the extension of the total axial length of the dual-clutch automatic transmission, and finally limiting the application of the dual-clutch automatic transmission in more vehicle models. Further, with regard to a parking ratchet wheel, in the structures of existing dual-clutch automatic transmissions, the parking ratchet wheel is usually arranged at an end of an output shaft. However, this will lead to uneven stress distribution along the output shaft which decreases the stability on the one hand, and on the other hand, if the parking ratchet wheel is located on the output shaft, the axial length of the transmission will be increased so that the difficulty of the full vehicle arrangement and full vehicle carrying is increased.

Figure 1:
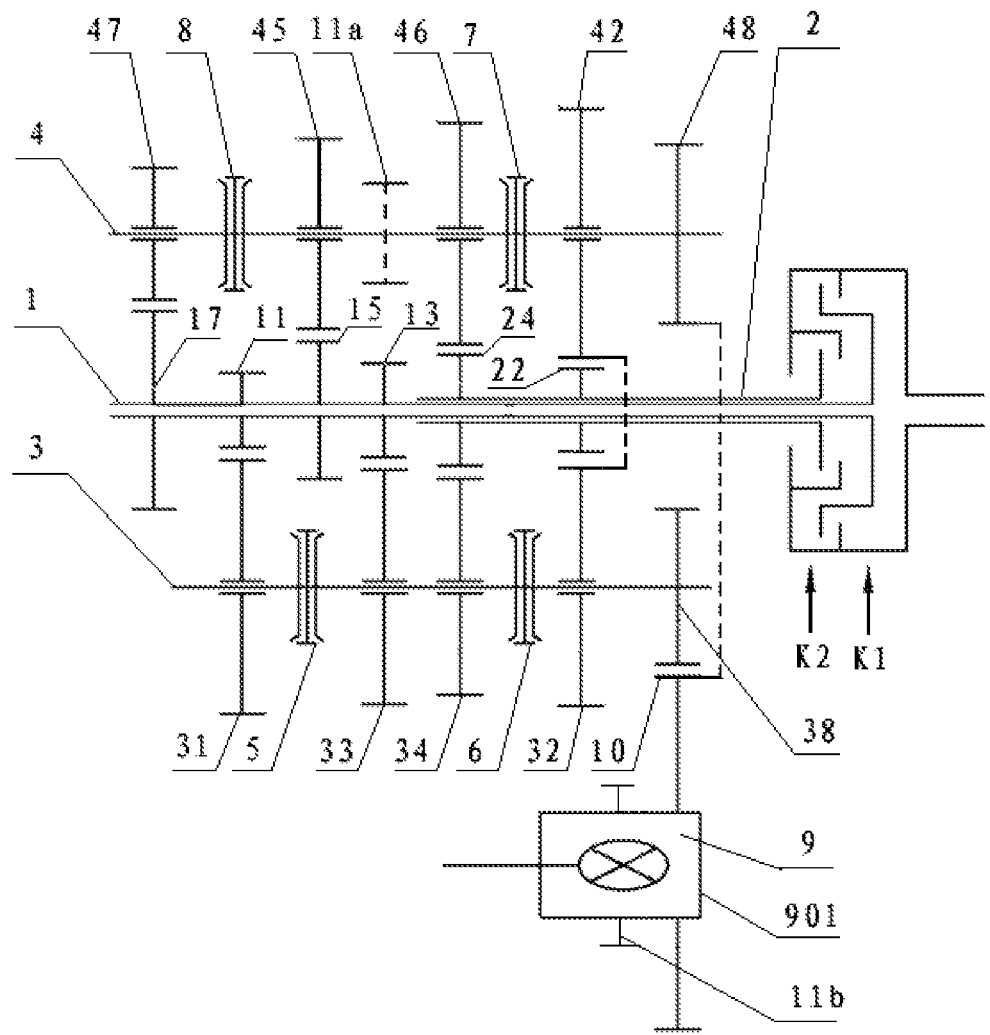
FIG. 1 is a schematic diagram of structure arrangement of a transmission according to an embodiment of the present invention.

FIG. 1 is a schematic diagram of structure arrangement of a transmission according to an embodiment of the present invention. As shown in FIG. 1, the present invention provides a dual-clutch automatic transmission, the transmission may include a housing (not shown), and the housing at least partially seals gear equipment of the transmission. The gear equipment may include a variety of shafts, mutually engaged coplanar gear sets, a dual-clutch assembly and synchronizers for selectively coupling, as will be described herein.

The shafts of the present invention may include a first input shaft 1 and a second input shaft 2 which are coaxially arranged.

The first input shaft 1 may have a first end and a second end which is opposite to the first end of the first input shaft. The second input shaft 2 may have a first end and a second end which is opposite to the first end of the second input shaft. Both ends of each of the first input shaft 1 and the second input shaft 2 are generally installed at the transmission housing by means of bearings.

The second input shaft 2 is a hollow shaft and is sleeved on and outside the first input shaft 1 so that the first input shaft 1 and the second input shaft 2 may freely rotate relative to each other.

The dual-clutch assembly of the present invention may include a first clutch K1 and a second clutch K2 which are concentrically embedded. The first clutch K1 is connected to the first input shaft 1 at the first end of the first input shaft, thereby rotating together with the first input shaft 1. The second clutch K2 is connected to the second input shaft 2 at the first end of the second input shaft, and the second clutch K2 can also rotate together with the second input shaft 2. In the dual-clutch automatic transmission of the present invention, the first gear and the reverse gear are controlled by different clutches, which is more conducive to the distribution and adjustment of speed ratios of the first gear and the reverse gear, and lowers the requirements on the starting thermal capacity of the clutches particularly at the first gear.

The shafts of the present invention may further include a first output shaft 3 and a second output shaft 4 which are arranged in parallel and spaced apart.

The mutually engaged coplanar gear sets of the present invention may include seven forward gear sets and one reverse gear set, which are respectively arranged on the first input shaft 1, the second input shaft 2, the first output shaft 3 and the second output shaft 4.

Specifically, a seventh-gear driving gearwheel 17, a first-gear driving gearwheel 11, a fifth-gear driving gearwheel 15 and a third-gear driving gearwheel 13 are fixedly arranged on the first input shaft 1 in sequence along a direction from the second end of the first input shaft to the first end of the first input shaft. A fourth-gear driving gearwheel 24 and a second-gear driving gearwheel 22 are fixedly arranged on the second input shaft 2 in sequence along a direction from the second end of the second input shaft to the first end of the second input shaft. Moreover, in the present invention, the fourth-gear driving gearwheel 24 is also used as a sixth-gear driving gearwheel, and the second-gear driving gearwheel 22 is also used as a reverse-gear driving gearwheel.

Meanwhile, a first-gear driven gearwheel 31, a third-gear driven gearwheel 33 and a fourth-gear driven gearwheel 34, which are respectively and correspondingly engaged with the first-gear driving gearwheel 11, the third-gear driving gearwheel 13 and the fourth-gear driving gearwheel 24, as well as a reverse-gear driven gearwheel 32, are rotatably supported on the first output shaft 3. A seventh-gear driven gearwheel 47, a fifth-gear driven gearwheel 45, a sixth-gear driven gearwheel 46 and a second-gear driven gearwheel 42, which are respectively and correspondingly engaged with the seventh-gear driving gearwheel 17, the fifth-gear driving gearwheel 15, the fourth-gear driving gearwheel 24 and the second-gear driving gearwheel 22 are rotatably supported on the second output shaft 4. The second-gear driven gearwheel 42 is also used as a reverse-gear idle gearwheel to be engaged with the reverse-gear driven gearwheel 32. Therefore, in the transmission of the present invention, among the forward gears, only the fourth gear and the sixth gear share a driving gearwheels, and the driving gearwheels of other forward gears are not shared, which is not only beneficial to decrease the overall axial length of the transmission, but also ensures easy full vehicle arrangement. The speed ratio ranges of these other forward gears are not influenced due to no sharing of gear sets, so that it is easier for the transmission to adjust the speed ratio according to the demands of matched vehicle models in order to adapt to more vehicle models.

In the present invention, the driving gearwheels and the driven gearwheels are constantly engaged. Specifically, the seventh-gear driving gearwheel 17 is constantly engaged with the seventh-gear driven gearwheel 47 to form the seventh gear set; the first-gear driving gearwheel 11 is constantly engaged with the first-gear driven gearwheel 31 to form the first gear set; the fifth-gear driving gearwheel 15 is constantly engaged with the fifth-gear driven gearwheel 45 to form the fifth gear set; the third-gear driving gearwheel 13 is constantly engaged with the third-gear driven gearwheel 33 to form the third gear set; the fourth-gear driving gearwheel 24 is constantly engaged with the fourth-gear driven gearwheel 34 to form the fourth gear set; the fourth-gear driving gearwheel 24 is constantly engaged with the sixth-gear driven gearwheel 46 to form the sixth gear set; and the second-gear driving gearwheel 22 is constantly engaged with the second-gear driven gearwheel 42 to form the second gear set. In addition, the second-gear driven gearwheel 42 is constantly engaged with the reverse-gear driven gearwheel 32, the second-gear driving gearwheel 22 is also used as the reverse-gear driving gearwheel in the embodiment, and the power is sequentially transmitted from the second-gear driving gearwheel 22 to the reverse-gear driven gearwheel 32 via the second-gear driven gearwheel 42 to achieve a reverse function. In such structure, a reverse-gear shaft is omitted, and due to omission of the reverse-gear shaft and related parts and components, the radial size of the transmission is effectively decreased, and a simpler assembly and a light weight are achieved.

It should be noted that, in the present invention, the gear arrangement on the first input shaft 1 or the second input shaft 2 is not necessarily as shown in FIG. 1, namely, the seventh-gear, the first-gear, the fifth-gear, the third-gear, the fourth-gear, the sixth-gear and the second/reverse-gear are arranged in sequence from left to right. For example, the third-gear, the fifth-gear, the first-gear, the seventh-gear, the fourth-gear, the sixth-gear and the second/reverse-gear and other arrangement manners may also be available, and are within the protection scope of the present invention as well. However, considering that a very large centrifugal force will be generated when rotating especially at the high-speed gears, if the high-speed gears are arranged at positions closer to the middle of the first input shaft 1, the first input shaft 1 may be bent or broken easier. Therefore, the seventh gear set serving as a high-speed gear is arranged at the outermost end of the first input shaft 1, namely, close to a mounting bearing, in this way, the service life of the first input shaft 1 can be prolonged, and the operation of the transmission is safer and more stable.

Furthermore, in the embodiment of the present invention, a part of the low-speed gears are arranged in the middle of a part of the high-speed gears, that is, there are two high speed gears are respectively arranged at both sides of a low gear, for example, the first-gear with low speed is arranged between the fifth-gear and the seventh-gear with high speeds, as another example, the third-gear with low speed is arranged between the fifth-gear and the sixth-gear with high speeds, and the like. Due to such an arrangement manner, the stress to the output shafts and the input shafts for supporting the gearwheels is more balanced, and the stability of the entire structure is improved. Because of the even distribution of gearwheels of the high-speed gears, the influence on the above stability caused by the change of a total axial length of the dual-clutch automatic transmission is relatively small, and thus the dual-clutch automatic transmission can be applied to more vehicle models.

Four synchronizers in the present invention may be provided and are respectively arranged between the driven gearwheels of two adjacent gears. Specifically, a first-third-gear synchronizer 5 is fixed on the first output shaft 3 between the first-gear driven gearwheel 31 and the third-gear driven gearwheel 33 for selectively transmitting a first-gear torque and a third-gear torque to the first output shaft 3. A fourth-reverse gear synchronizer 6 is fixedly arranged on the first output shaft 3 between the fourth-gear driven gearwheel 34 and the reverse-gear driven gearwheel 32 for selectively transmitting a fourth-gear torque and a reverse-gear torque to the first output shaft 3. A second-sixth-gear synchronizer 7 is fixedly arranged on the second output shaft 4 between the sixth-gear driven gearwheel 46 and the second-gear driven gearwheel 42 for selectively transmitting a sixth-gear torque and a second-gear torque to the second output shaft 4. A fifth-seventh-gear synchronizer 8 is fixedly arranged on the second output shaft 4 between the seventh-gear driven gearwheel 47 and the fifth-gear driven gearwheel 45 for selectively transmitting a seventh-gear torque and a fifth-gear torque to the second output shaft 4.

A first output gearwheel 38 may be fixedly connected to an end of the first output shaft 3 in the present invention, the first output gearwheel 38 is engaged with a driven reduction gearwheel 10 of a differential 9 for outputting the torque of the first output shaft 3, wherein the differential 9 is provided with a differential case 901 and other components. Similarly, a second output gear 48 may be fixedly connected to an end of the second output shaft 4, and the second output gear 48 is engaged with the driven reduction gearwheel 10 for outputting the torque of the second output shaft 4. The torque output manner herein is similar to that of most of dual-clutch structures, and thus will not be described in detail herein.

A parking ratchet wheel 11b may be fixedly arranged on the differential case 901, which belongs to a part of a parking mechanism (not completely shown) and plays a parking function. Due to this arrangement manner, the axial length of the transmission can be saved, and the full vehicle carrying and the arrangement of a parking pull rod mechanism of the transmission are facilitated. Moreover, compared to a manner that the parking ratchet wheel is arranged near the differential gear ring, the present invention can further save the axial length of the differential and is convenient for the full vehicle carrying and the arrangement of the parking pull rod mechanism of the transmission as well. It should be noted that, in other alternative embodiments, the parking ratchet wheel may be arranged at other positions. For example, a parking ratchet wheel 11a further shown in FIG. 1 in the embodiment of the present invention can be used for replacing the parking ratchet wheel 11b in the above embodiment, and the parking ratchet wheel 11a can be fixedly arranged on the second output shaft between the fifth-gear driven gearwheel 45 and the sixth-gear driven gearwheel 46, namely, being located at the central position of the second output shaft. The parking ratchet wheel 11a also belongs to a part of the parking mechanism (not completely shown) and plays the parking function. Due to this arrangement manner, the stress distribution on the output shaft is more even, the stability is improved and the service life is prolonged. Moreover, those skilled in the art should appreciate that generally only one of the parking ratchet wheels 11a 11b is required for the dual-clutch automatic transmission to operate normally.

Figure 2:
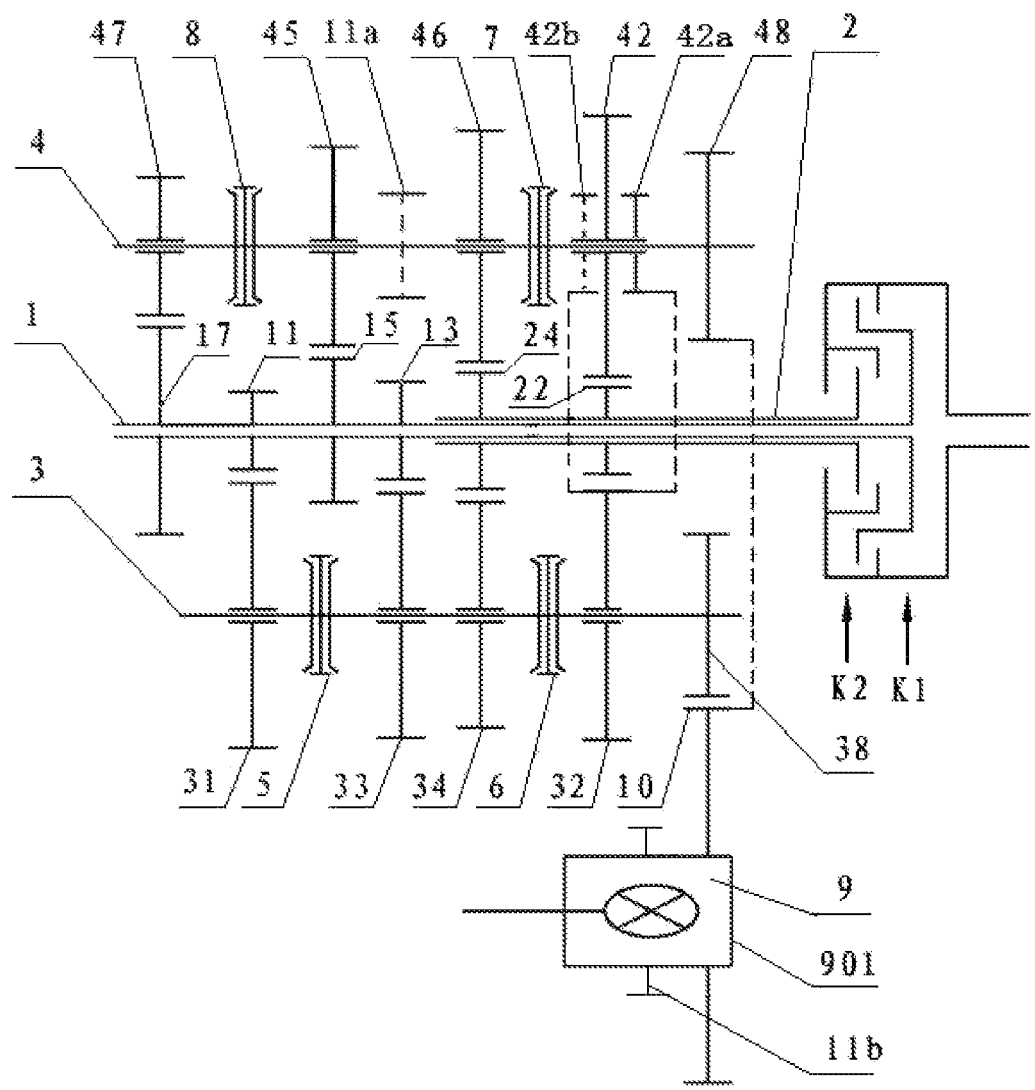
FIG. 2 is a schematic diagram of structure arrangement of a transmission according to other alternative embodiments of the present invention.

In addition, FIG. 2 is a schematic diagram of structure arrangement of a transmission according to other alternative embodiments of the present invention. In the other alternative embodiments, the structure of the dual-clutch automatic transmission is basically the same as that of the dual-clutch automatic transmission in the embodiment as shown in FIG. 1, and the arrangement manner of the parking ratchet wheel at least has the above two conditions.

The difference lies in that, as shown in FIG. 2, in the embodiment, the seventh-gear driven gearwheel 47, the fifth-gear driven gearwheel 45, the sixth-gear driven gearwheel 46, a reverse-gear idle gearwheel 42a and the second-gear driven gearwheel 42 respectively and correspondingly engaged with the seventh-gear driving gearwheel 17, the fifth-gear driving gearwheel 15, the fourth-gear driving gearwheel 24, the reverse-gear driven gearwheel 32 and the second-gear driving gearwheel 22 are rotatably supported on the second output shaft 4, wherein the second-gear driven gearwheel 42 and the reverse-gear idle gearwheel 42a constitute a form of a duplex gear, and the second-gear driving gearwheel 22 is also used as the reverse-gear driving gearwheel, so that power is sequentially transmitted through the second-gear driving gearwheel 22, the second-gear driven gearwheel 42 and the reverse-gear idle gearwheel 42a to the reverse-gear driven gearwheel 32 to achieve a reverse function. In the embodiment, this structure can omit the use of a reverse-gear shaft and related parts and components to effectively decrease the radial size of the transmission, ensure simpler assembly and benefit the achievement of light weight on the one hand. On the other hand, the reverse gear adopts the duplex gear, which is more conducive to the distribution and adjustment of speed ratios of the second gear and the reverse gear, and lowers the requirements on the starting thermal capacity of clutches at the reverse gear.

In the embodiment, particularly as shown in FIG. 2, the reverse-gear idle gearwheel 42a may be located at a side of the second-gear driven gearwheel 42 away from the sixth-gear driven gearwheel 46. Of course, in other alternative embodiments, the reverse-gear idle gearwheel may be arranged at other positions, for example, a reverse-gear idle gearwheel 42b further shown in FIG. 2 can be used for replacing the reverse-gear idle gearwheel 42a in the above embodiment, the reverse-gear idle gearwheel 42b may be located at the other side of the second-gear driven gearwheel 42, namely, may be located at a side of the second-gear driven gearwheel 42 facing to the sixth-gear driven gearwheel 46. The reverse-gear idle gearwheel 42b may be correspondingly engaged with the reverse-gear driven gearwheel 32, this is a common setting method at present, and thus will not be described in detail herein. Those of ordinary skill in the art should appreciate that generally only one of the reverse-gear idle gearwheels 42a and 42b is required for the dual-clutch automatic transmission to operate normally.

The power transmission paths of the seven forward gears and the one reverse gear of the present invention are as follows.

At the first gear, the first clutch K1 is closed, the torque of an engine is transmitted via the first clutch K1 to the first input shaft 1, and is further transmitted via the first-gear driving gearwheel 11 on the first input shaft 1 to the first-gear driven gearwheel 31. The first-gear driven gearwheel 31 is engaged with the first-third-gear synchronizer 5 for transmitting the torque to the first output shaft 3, and then the torque is transmitted via the first output gear 38 to the driven reduction gearwheel 10, and is finally transmitted outwards.

When the vehicle enters the first gear, the second clutch K2 is in an open state and transmits no power. When the vehicle accelerates to a shift point of the second gear, an automatic shift mechanism can shift the gear to the second gear in advance, namely, engaging the second-sixth-gear synchronizer 7 with the second-gear driven gearwheel 42, and then, the first clutch K1 is open, the second clutch K2 is closed, the shift process is ended, and the vehicle enters the second gear.

At the second gear, the second clutch K2 is closed, the torque of the engine is transmitted via the second clutch K2 to the second input shaft 2, and is further transmitted via the second-gear driving gearwheel 22 on the second input shaft 2 to the second-gear driven gearwheel 42. The second-gear driven gearwheel 42 is engaged with the second-sixth-gear synchronizer 7 for transmitting the torque to the second output shaft 4, and then the torque is transmitted via the second output gear 48 to the driven reduction gearwheel 9 and is finally transmitted outwards.

When the vehicle enters the second gear, an automatic transmission electric control unit in a vehicle can determine a current operation state of the vehicle according to related sensor signals, and can further determine the next gear that the vehicle will enter. For example, in the case of vehicle acceleration, the next gear is the third gear, and in the case of vehicle deceleration, the next gear is the first gear. Both of the first gear and the second gear are controlled by the first clutch K1, and since the first clutch K1 is in the open state and transmits no power at present, the gear about to work can be shifted to by the automatic shift mechanism in advance. When the vehicle arrives at the shift point, the only operation is to open the working second clutch K2 and close the first clutch K1. When the two clutches are switched in sequence, the entire shift process is finished. The switching processes of the other forward gears are the same, and will not be described in detail below.

At the third gear, the first clutch K1 is closed, the torque of the engine is transmitted via the first clutch K1 to the first input shaft 1, and is further transmitted via the third-gear driving gearwheel 13 on the first input shaft 1 to the third-gear driven gearwheel 33. The third-gear driven gearwheel 33 is engaged with the first-third-gear synchronizer 5 for transmitting the torque to the first output shaft 3, and then the torque is transmitted via the first output gear 38 to the driven reduction gearwheel 9, and is finally transmitted outwards.

At the fourth gear, the second clutch K2 is closed, the torque of the engine is transmitted via the second clutch K2 to the second input shaft 2, and is further transmitted via the fourth-gear driving gearwheel 24 on the second input shaft 2 to the fourth-gear driven gearwheel 34. The fourth-gear driven gearwheel 34 is engaged with the fourth-reverse gear synchronizer 6 for transmitting the torque to the first output shaft 3, and then the torque is transmitted via the first output gear 38 to the driven reduction gearwheel 9, and is finally transmitted outwards.

At the fifth gear, the first clutch K1 is closed, the torque of the engine is transmitted via the first clutch K1 to the first input shaft 1, and is further transmitted via the fifth-gear driving gearwheel 15 on the first input shaft 1 to the fifth-gear driven gearwheel 45. The fifth-gear driven gearwheel 45 is engaged with the fifth-seventh-gear synchronizer 8 for transmitting the torque to the second output shaft 4, and then the torque is transmitted via the second output gear 48 to the driven reduction gearwheel 9, and is finally transmitted outward.

At the sixth gear, the second clutch K2 is closed, the torque of the engine is transmitted via the second clutch K2 to the second input shaft 2, and is further transmitted via the fourth-gear driving gearwheel 24 on the second input shaft 2 to the sixth-gear driven gearwheel 46. The sixth-gear driven gearwheel 46 is engaged with the second-sixth-gear synchronizer 7 for transmitting the torque to the second output shaft 4, and then the torque is transmitted via the second output gear 48 to the driven reduction gearwheel 9, and is finally transmitted outwards.

At the seventh gear, the first clutch K1 is closed, the torque of the engine is transmitted via the first clutch K1 to the first input shaft 1, and is further transmitted via the seventh-gear driving gearwheel 17 on the first input shaft 1 to the seventh-gear driven gearwheel 47. The seventh-gear driven gearwheel 47 is engaged with the fifth-seventh-gear synchronizer 8 for transmitting the torque to the second output shaft 4, and then the torque is transmitted via the second output gear 48 to the driven reduction gearwheel 9, and is finally transmitted outwards.

With regard to the reverse gear, the transmission paths can be in two manners according to the above embodiments.

For the first manner, the second-gear driven gearwheel 42 is also used as the reverse-gear idle gearwheel to be engaged with the reverse-gear driven gearwheel 32. Specifically, the second clutch K2 is closed, the torque of the engine is transmitted via the second clutch K2 to the second input shaft 2, and is further transmitted via the second-gear driving gearwheel 22 on the second input shaft 2 to the second-gear driven gearwheel 42. The second-gear driven gearwheel 42 drives the engaged reverse-gear driven gearwheel 32 to transmit the torque to the reverse-gear driven gearwheel 32. The reverse-gear driven gearwheel 32 is engaged with the fourth-reverse gear synchronizer 6 for transmitting the torque to the first output shaft 3, and then the torque is transmitted via the first output gear 38 to the driven reduction gearwheel 9 and is finally transmitted outwards.

For the second manner, the reverse-gear idle gearwheel 42a or the reverse-gear idle gearwheel 42b is rotatably supported on the second output shaft 4, and the reverse-gear idle gearwheel 42a or the reverse-gear idle gearwheel 42b may constitute the form of the duplex gear with the second-gear driven gearwheel 42, so that the reverse-gear idle gearwheel 42a or the reverse-gear idle gearwheel 42b is engaged with the reverse-gear driven gearwheel 32. Specifically, the second clutch K2 is closed, the torque of the engine is transmitted via the second clutch K2 to the second input shaft 2, and is further transmitted via the second-gear driving gearwheel 22 on the second input shaft 2 to the second-gear driven gearwheel 42, the second-gear driven gearwheel 42 drives the reverse-gear idle gearwheel 42a or the reverse-gear idle gearwheel 42b of the duplex gear. The torque is transmitted via the reverse-gear idle gearwheel 42a or the reverse-gear idle gearwheel 42b to the reverse-gear driven gearwheel 32, the reverse-gear driven gearwheel 32 is engaged with the fourth-reverse gear synchronizer 6 for transmitting the torque to the first output shaft 3, and then the torque is transmitted via the first output gear 38 to the driven reduction gearwheel 9 and is finally transmitted outwards.

So far, those skilled in the art would recognize that although a plurality of exemplary embodiments of the present invention have been shown and described in detail, a lot of other variations or modifications conforming to the principle of the present invention may still be directly determined or deduced according to the disclosed contents of the present invention. Therefore, the scope of the present invention should be understood and recognized as covering all such other variations or modifications.

The invention claimed is:

1. A dual-clutch automatic transmission, comprising:
a first input shaft having a first end and a second end opposite to the first end of the first input shaft;
a first clutch connected to the first input shaft at the first end of the first input shaft;
a second input shaft having a first end and a second end opposite to the first end of the second input shaft; wherein the second input shaft is a hollow shaft and is sleeved on the first input shaft;
a second clutch connected to the second input shaft at the first end of the second input shaft;
a seventh-gear driving gearwheel, a first-gear driving gearwheel, a fifth-gear driving gearwheel and a third-gear driving gearwheel, which are individually arranged and are fixedly connected to the first input shaft;
a fourth-gear driving gearwheel and a second-gear driving gearwheel, which are individually arranged and are fixedly connected to the second input shaft; wherein, the fourth-gear driving gearwheel is also used as a sixth-gear driving gearwheel, and the second-gear driving gearwheel is also used as a reverse-gear driving gearwheel in order to omit a reverse-gear shaft;
a first output shaft and a second output shaft on which driven gearwheels respectively engaged with the corresponding driving gearwheels are rotatably supported; and
a parking ratchet wheel,
wherein a seventh-gear driven gearwheel, a fifth-gear driven gearwheel, a sixth-gear driven gearwheel, and a second-gear driven gearwheel respectively and correspondingly engaged with the seventh-gear driving gearwheel, the fifth-gear driving gearwheel, the fourth-gear driving gearwheel, and the second-gear driving gearwheel are rotatably supported on the second output shaft; and
a first-gear driven gearwheel, a third-gear driven gearwheel, and a fourth-gear driven gearwheel respectively and correspondingly engaged with the first-gear driving gearwheel, the third-gear driving gearwheel, the fourth-gear driving gearwheel, and a reverse-gear driven gearwheel are rotatably supported on the first output shaft,
wherein the second-gear driven gearwheel is also used as a reverse-gear idle gearwheel to be engaged with the reverse-gear driven gearwheel,
wherein a power is sequentially transmitted from the second-gear driving gearwheel to the reverse-gear driven gearwheel via the second-gear driven gearwheel to achieve a reverse function without using any reverse-gear shaft.

2. The dual-clutch automatic transmission of claim 1, wherein the seventh-gear driving gearwheel, the first-gear driving gearwheel, the fifth-gear driving gearwheel and the third-gear driving gearwheel are sequentially arranged on the first input shaft along a direction from the second end of the first input shaft to the first end of the first input shaft.

3. The dual-clutch automatic transmission of claim 1, wherein the fourth-gear driving gearwheel and the second-gear driving gearwheel are sequentially arranged on the second input shaft along a direction from the second end of the second input shaft to the first end of the second input shaft.

4. The dual-clutch automatic transmission of claim 1, wherein the parking ratchet wheel is fixedly connected to the second output shaft between the fifth-gear driven gearwheel and the sixth-gear driven gearwheel.

5. The dual-clutch automatic transmission of claim 1, further comprising a differential with a differential case, wherein, the parking ratchet wheel is fixedly arranged on the differential case.

6. The dual-clutch automatic transmission of claim 1, further comprising a reverse-gear idle gearwheel rotatably supported on the second output shaft, and the reverse-gear idle gearwheel is engaged with the reverse-gear driven gearwheel;
wherein, the reverse-gear idle gearwheel is located at a side of the second-gear driven gearwheel away from the sixth-gear driven gearwheel, and constitutes a form of a duplex gear with the second-gear driven gearwheel.

7. The dual-clutch automatic transmission of claim 1, further comprising a reverse-gear idle gearwheel rotatably supported on the second output shaft, and the reverse-gear idle gearwheel is engaged with the reverse-gear driven gearwheel;
wherein, the reverse-gear idle gearwheel is located at a side of the second-gear driven gearwheel facing the sixth-gear driven gearwheel, and constitutes a form of a duplex gear with the second-gear driven gearwheel.

8. The dual-clutch automatic transmission of claim 1, wherein a first-third-gear synchronizer is fixedly arranged on the first output shaft between the first-gear driven gearwheel and the third-gear driven gearwheel; and a fourth-reverse-gear synchronizer is fixedly arranged on the first output shaft between the fourth-gear driven gearwheel and the reverse-gear driven gearwheel; and
a second-sixth-gear synchronizer is fixedly arranged on the second output shaft between the sixth-gear driven gearwheel and the second-gear driven gearwheel; and a fifth-seventh-gear synchronizer is fixedly arranged on the second output shaft between the seventh-gear driven gearwheel and the fifth-gear driven gearwheel.

9. A dual-clutch automatic transmission, comprising:
a first input shaft having a first end and a second end opposite to the first end of the first input shaft;
a first clutch connected to the first input shaft at the first end of the first input shaft;
a second input shaft having a first end and a second end opposite to the first end of the second input shaft; wherein the second input shaft is a hollow shaft and is sleeved on the first input shaft;
a second clutch connected to the second input shaft at the first end of the second input shaft;
a seventh-gear driving gearwheel, a first-gear driving gearwheel, a fifth-gear driving gearwheel and a third-gear driving gearwheel, which are individually arranged and are fixedly connected to the first input shaft;
a fourth-gear driving gearwheel and a second-gear driving gearwheel, which are individually arranged and are fixedly connected to the second input shaft; wherein, the fourth-gear driving gearwheel is also used as a sixth-gear driving gearwheel, and the second-gear driving gearwheel is also used as a reverse-gear driving gearwheel in order to omit a reverse-gear shaft;
a first output shaft and a second output shaft on which driven gearwheels respectively engaged with the corresponding driving gearwheels are rotatably supported; and a parking ratchet wheel;

wherein the seventh-gear driving gearwheel, the first-gear driving gearwheel, the fifth-gear driving gearwheel and the third-gear driving gearwheel are sequentially arranged on the first input shaft along a direction from the second end of the first input shaft to the first end of the first input shaft;

wherein the fourth-gear driving gearwheel and the second-gear driving gearwheel are sequentially arranged on the second input shaft along a direction from the second end of the second input shaft to the first end of the second input shaft;

wherein a seventh-gear driven gearwheel, a fifth-gear driven gearwheel, a sixth-gear driven gearwheel and a second-gear driven gearwheel respectively and correspondingly engaged with the seventh-gear driving gearwheel, the fifth-gear driving gearwheel, the fourth-gear driving gearwheel and the second-gear driving gearwheel are rotatably supported on the second output shaft;

a first-gear driven gearwheel, a third-gear driven gearwheel and a fourth-gear driven gearwheel respectively and correspondingly engaged with the first-gear driving gearwheel, the third-gear driving gearwheel and the fourth-gear driving gearwheel, and a reverse-gear driven gearwheel are rotatably supported on the first output shaft;

wherein the parking ratchet wheel is fixedly connected to the second output shaft between the fifth-gear driven gearwheel and the sixth-gear driven gearwheel; and wherein a power is sequentially transmitted from the second-gear driving gearwheel to the reverse-gear driven gearwheel via the second-gear driven gearwheel to achieve a reverse function without using any reverse-gear shaft.

* * * * *